United States Patent
Zhou

(10) Patent No.: US 11,974,293 B2
(45) Date of Patent: Apr. 30, 2024

(54) METHOD AND APPARATUS FOR TRANSMITTING INFORMATION, AND STORAGE MEDIUM, TERMINAL AND BASE STATION

(71) Applicant: BEIJING XIAOMI MOBILE SOFTWARE CO., LTD., Beijing (CN)

(72) Inventor: Juejia Zhou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 605 days.

(21) Appl. No.: 17/266,248

(22) PCT Filed: Aug. 10, 2018

(86) PCT No.: PCT/CN2018/100043
§ 371 (c)(1),
(2) Date: Feb. 5, 2021

(87) PCT Pub. No.: WO2020/029271
PCT Pub. Date: Feb. 13, 2020

(65) Prior Publication Data
US 2021/0307052 A1 Sep. 30, 2021

(51) Int. Cl.
*H04W 72/12* (2023.01)
*H04W 72/23* (2023.01)

(52) U.S. Cl.
CPC ................... *H04W 72/23* (2023.01)

(58) Field of Classification Search
None
See application file for complete search history.

(56) References Cited

U.S. PATENT DOCUMENTS

2017/0230971 A1   8/2017   Lee
2018/0124778 A1   5/2018   Verma et al.
(Continued)

FOREIGN PATENT DOCUMENTS

CN   107734653 A   2/2018
WO   WO 2017/097581 A1   6/2017
(Continued)

OTHER PUBLICATIONS

Extended European Search Report dated Feb. 22, 2022 in European Patent Application No. 18929761.7, 9 pages.
(Continued)

*Primary Examiner* — Steve R Young
(74) *Attorney, Agent, or Firm* — Oblon, McClelland, Maier & Neustadt, L.L.P.

(57) ABSTRACT

Aspects of the disclosure provide a method and apparatus for transmitting information, and a storage medium, a terminal and a base station. The method can include determining feedback resource configuration information currently configured for a terminal, where the feedback resource configuration information includes multiple target feedback resource units. The method can further include transmitting the feedback resource configuration information to the terminal, such that the terminal, when carrying out downlink transmission with the base station, transmits first response information corresponding to a first downlink resource range occupied during the downlink transmission to the base station on the multiple target feedback resource units.

15 Claims, 6 Drawing Sheets

(56) References Cited

U.S. PATENT DOCUMENTS

| | | | |
|---|---|---|---|
| 2018/0359072 A1* | 12/2018 | Tiirola | H04L 1/1854 |
| 2019/0116006 A1 | 4/2019 | Lunttila et al. | |
| 2019/0150122 A1* | 5/2019 | Ying | H04W 72/23 |
| | | | 370/329 |
| 2019/0181988 A1* | 6/2019 | Gao | H04L 1/1858 |
| 2019/0393992 A1* | 12/2019 | Xiong | H04L 1/1812 |
| 2021/0243749 A1* | 8/2021 | Hoang | H04W 72/02 |

FOREIGN PATENT DOCUMENTS

| | | |
|---|---|---|
| WO | WO 2017/167394 A1 | 10/2017 |
| WO | WO 2018/085381 A1 | 5/2018 |
| WO | WO 2018/141177 A1 | 8/2018 |

OTHER PUBLICATIONS

International Search Report dated May 7, 2019 in PCT/CN2018/100043 filed on Aug. 10, 2018, 2 pages.

* cited by examiner

METHOD AND APPARATUS FOR TRANSMITTING INFORMATION, AND STORAGE MEDIUM, TERMINAL AND BASE STATION

CROSS-REFERENCE TO RELATED APPLICATION

This application is a U.S. national phase application of International Application No. PCT/CN2018/100043, filed on Aug. 10, 2018, which is incorporated herein by reference in its entirety.

TECHNICAL FIELD

The present disclosure relates to the communication field, including to a method and an apparatus for transmitting information, a storage medium, a terminal and a base station.

BACKGROUND

The New Radio Access Technology (NR) system in 5th-Generation (5G) network is an important application scenario of 5G. When 5G NR transmission is applied in unlicensed frequency bands, since the unlicensed frequency bands are not regulated by operators' deployment networks, a base station needs to overcome interference problems caused by transmissions of other base stations. An existing way of avoiding interference is License Before Talk (LBT) mechanism, that is, different channels are divided in the unlicensed frequency bands, when the base station adopts a certain channel for transmission, it needs to determine that no other transmissions are performed on the channel before starting its transmission.

When the base station performs a downlink transmission, generally, there is an opportunity for an uplink transmission on the last resource unit within a downlink resource range, and the terminal may feedback response information, such as acknowledged ACK/non-acknowledged NACK information, of the downlink transmission on this resource unit. However, in the LBT mechanism, if the last resource unit is occupied, for example, when other systems transmit data on this resource unit, the base station cannot perform the uplink transmission on the last resource unit, such that the uplink transmission may not be performed, resulting in inability of transmitting the response information.

SUMMARY

Exemplary embodiments of the present disclosure provide a method and an apparatus for transmitting information, a storage medium, a terminal and a base station.

In a first aspect, the present disclosure can provide a method for transmitting information, which is applicable to a base station. The method can include determining feedback resource configuration information configured for a terminal, in which the feedback resource configuration information includes a plurality of target feedback resource units, and transmitting the feedback resource configuration information to the terminal, such that the terminal transmits first response information corresponding to a first downlink resource range occupied by a downlink transmission to the base station on the plurality of target feedback resource units when the downlink transmission occurs between the terminal and the base station.

In a second aspect, the present disclosure can provide a method for transmitting information, which is applicable to a terminal. The method can include receiving feedback resource configuration information transmitted by a base station, in which the feedback resource configuration information includes a plurality of target feedback resource units, and transmitting first response information corresponding to a first downlink resource range occupied by a downlink transmission to the base station on the plurality of target feedback resource units when the downlink transmission is performed with the base station.

In a third aspect, the present disclosure provides an apparatus for transmitting information, which is applicable to a base station. The apparatus can include a configuration information determining module and a configuration information transmitting module. The configuration information determining module can be configured to determine feedback resource configuration information configured for a terminal, in which the feedback resource configuration information includes a plurality of target feedback resource units. The configuration information transmitting module can be configured to send the feedback resource configuration information to the terminal, such that the terminal transmits first response information corresponding to a first downlink resource range occupied by a downlink transmission to the base station on the plurality of target feedback resource units when the downlink transmission occurs between the terminal and the base station.

In a fourth aspect, the present disclosure can provide an apparatus for transmitting information, which is applicable to a terminal. The apparatus can include a configuration information receiving module and a response information transmitting module. The configuration information receiving module is configured to receive feedback resource configuration information transmitted by a base station, in which the feedback resource configuration information includes a plurality of target feedback resource units. The response information transmitting module is configured to send first response information corresponding to a first downlink resource range occupied by a downlink transmission to the base station on the plurality of target feedback resource units when the downlink transmission is performed with the base station.

In a fifth aspect, the present disclosure can provide a non-transitory computer-readable storage medium including one or more programs, and the one or more programs are used to execute the method according to the first aspect.

In a sixth aspect, the present disclosure can provide a non-transitory computer-readable storage medium including one or more programs, and the one or more programs are used to execute the method according to the second aspect.

In a seventh aspect, the present disclosure can provide a base station, and the base station can include a memory on which a computer program is store and a processor that is configured to execute the computer program in the memory to implement the method according to the first aspect.

In an eighth aspect, the present disclosure can provide a terminal that can include a memory on which a computer program is stored and a processor that is configured to execute the computer program in the memory to implement the method according to the second aspect.

BRIEF DESCRIPTION OF THE DRAWINGS

Various exemplary embodiments of this disclosure that are proposed as examples will be described in detail with reference to the following figures, wherein like numerals reference like elements, and wherein.

DETAILED DESCRIPTION

Figure 1:
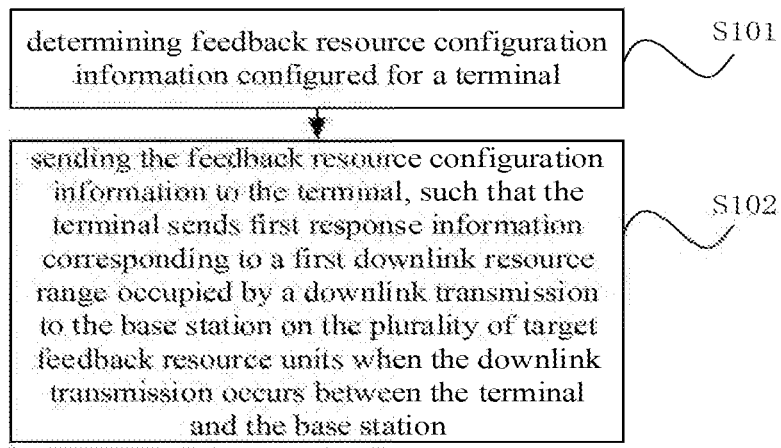
FIG. 1 is a flowchart of a method for transmitting information according to an embodiment of the disclosure.

The specific embodiments of the present disclosure will be described in detail below with reference to the accompanying drawings. It should be understood that the specific embodiments described herein are only used to illustrate and explain the present disclosure, and are not used to limit the present disclosure.

Firstly, the application scenario of the present disclosure is explained. Rapid growth of mobile broadband services has led to an increasingly strong demand of the operators' cellular networks for spectrum. Currently, a main usage form of the spectrum of a cellular network is a dedicated spectrum, that is, the spectrum is unique to a certain network. Although the dedicated spectrum for exclusive use is more efficient, the cost is expensive and a total amount of spectrum is limited. Secondly, unlicensed spectrum has attracted increasing attention from operators due to its abundant usable bandwidth and low licensing fees. In some areas, technical applications on the unlicensed spectrum need to follow certain regulations to fairly coexist with other technologies, such as Wi-Fi, or to enable different operators' networks or different cellular communication systems to fairly coexist on the unlicensed spectrum. Therefore, for the NR system, it is not only necessary to meet the regulatory requirements, but also to ensure that no obvious impact is caused on the existing system, so that it can coexist fairly with other technologies on the unlicensed spectrum while meeting the regulatory requirements so as to avoid channel conflicts. An existing method to ensure fair coexistence is called LBT. This method is mainly to perform a clear channel assessment check before using a channel to determine whether the channel is free, and only when the channel is free, a downlink transmission is performed.

When the base station performs the downlink transmission, for example, the base station transmits downlink data to the terminal, generally there is one chance for uplink transmission on the last resource unit within a downlink resource range. The terminal can feedback response information, such as confirmed ACK/unconfirmed NACK information, of the downlink transmission to the base station on this resource unit. Then the base station determines whether the terminal has received the correct downlink data according to the ACK/NACK information. If the response information is the ACK information, it is determined that the terminal has received the correct downlink data. If the response information is the NACK Information, it is determined that the terminal has received wrong downlink data. In this case, the base station needs to retransmit the downlink data corresponding to the downlink resource range.

The downlink resource range may be a sub-frame or a time slot, the resource unit may be a time slot or a symbol, and the symbol may be an Orthogonal Frequency Division Multiplexing (OFDM) symbol, which is just an example and is not limited in the present disclosure. Taking the downlink resource range including 14 symbols as an example, the 14 symbols are sequentially denoted as symbol 0, symbol 1, . . . , symbol 12, and symbol 13, where symbol 0 is used for transmitting downlink control information, symbols 1 to 11 are used to transmit downlink transmission data, symbol 12 is a blank symbol, and symbol 13 is the last resource unit in the downlink resource range. The resource unit may be a preset uplink feedback resource unit, that is, the response information (ACK/NACK information) of the downlink resource range is fed back on the resource unit.

When the base station and the terminal perform LBT detection, if the symbol 13 is occupied, for example, if there are other systems transmitting data on the resource unit, the uplink transmission is blocked, and the terminal cannot feedback response information to the base station on the symbol 13. Thus, the opportunity for uplink transmission is missing and it is impossible to send the response information.

The present disclosure provides a method and an apparatus for transmitting information, a storage medium, a base station and a terminal. The method can configure feedback resource configuration information for the terminal. The terminal determines a plurality of target feedback resource units according to the feedback resource configuration information, so that the first response information corresponding to the downlink resource range is transmitted to the base station on the plurality of target feedback resource units. In the present disclosure, the first response information can be transmitted for many times through the plurality of target feedback resource units, so that even if there are resource units blocked in the uplink transmission in the plurality of target feedback resource units, the uplink feedback can be realized on other target feedback resource units.

The disclosure will be described below in combination with specific embodiments.

FIG. 1 is a flowchart of a method for transmitting information according to an embodiment of the disclosure. As illustrated in FIG. 1, the method is applicable to a base station, and the method includes the following steps.

At block S101, feedback resource configuration information configured for a terminal is determined. In this block, the feedback configuration information may include a plurality of target feedback resource units, and the plurality of target feedback resource units may be determined in any of the following two ways. In the first way, a plurality of preset uplink feedback resource units may be determined, and the plurality of preset uplink feedback resource units may be used as the plurality of target feedback resource units to obtain the feedback resource configuration information. For example, the base station may configure the last resource unit of four consecutive downlink resource ranges starting from a first downlink resource range as the target feedback resource units. Taking four consecutive downlink resource ranges in which the resource unit is denoted as a symbol as an example, if each downlink resource range includes 14 symbols, which are respectively symbol 0 to symbol 13, then symbol 13 in each downlink resource range is used as a target feedback resource unit.

In the second way, a target feedback resource unit set is determined from a plurality of preset feedback resource unit sets each including a plurality of uplink feedback resource units. The plurality of uplink feedback resource units in the target feedback resource unit set are determined as the plurality of target feedback resource units, in which different feedback resource unit sets have different uplink feedback resource units. For example, still taking four continuous downlink resource ranges in which the resource unit is denoted as a symbol as an example, the four continuous downlink resource ranges are sequentially denoted as range 1, range 2, range 3, and range 4. If the plurality of preset feedback resource unit sets include set 1 and set 2, set 1 includes symbol 13 of range 1, symbol 13 of range 2 and symbol 13 of range 3, then set 1 indicates that the resource units configured by the base station for the terminal to send first response information are symbol 13 in range 1, symbol 13 in range 2 and symbol 13 in range 3. That is, after receiving the feedback resource configuration information, the terminal transmits the first response information corresponding to the first downlink resource range on symbol 13 in range 1, symbol 13 in range 2 and symbol 13 in range 3 respectively. Set 2 includes symbol 13 of range 1, symbol 13 of the range 2 and symbol 13 of the range 4, then set 2 indicates that the uplink feedback resource units configured by the base station for the terminal to send the first response information are symbol 13 in range 1, symbol 13 in range 2 and symbol 13 in range 4. In other words, after receiving the feedback resource configuration information, the terminal transmits the first response information corresponding to the first downlink resource range on symbol 13 in range 1, symbol 13 in range 2 and symbol 13 in range 4, respectively. The base station may determine set 1 or set 2 as the target feedback resource unit set. For example, set 1 can be used as the target feedback resource unit set, and the plurality of uplink feedback resource units in set 1 are used as the plurality of target feedback resource units. Certainly, the above set 1 and set 2 are just examples, which are not limited in the present disclosure.

At block S102, the feedback resource configuration information is transmitted to the terminal, such that the terminal transmits first response information corresponding to a first downlink resource range occupied by a downlink transmission to the base station on the plurality of target feedback resource units when the downlink transmission occurs between the terminal and the base station.

The first response information may be ACK/NACK information. ACK information means that downlink data is received correctly, and NACK information means that the downlink data is received incorrectly. When the base station receives the NACK information, the downlink data in the downlink resource range corresponding to the NACK information needs to be re-transmitted. The ACK/NACK information can be identified by an identification bit. For example, the ACK information may be represented by 1 and the NACK information may be represented by 0.

In this block, the base station may broadcast the feedback resource configuration information through a broadcast signaling, the base station may also send the feedback resource configuration information through a RRC message, the base station may also send the feedback resource configuration information through a MAC CE signaling, and the base station may also send the feedback resource configuration information by using a physical layer signaling.

After receiving the feedback resource configuration information, the terminal determines the plurality of target feedback resource units according to the feedback resource configuration information, and transmits the first response information corresponding to the first downlink resource range to the base station on the plurality of target feedback resource units. The base station may receive the first response information transmitted by the terminal on the plurality of target feedback resource units, and determine a target response result of the terminal according to the first response information.

For example, the target response result of the terminal may be determined in any of the following three ways. In first way, the target response result of the terminal is determined based on the earliest received first response information. For example, taking the terminal transmitting the first response information on four target feedback resource units as an example, when the base station does not receive the first response information on the first target feedback resource unit but receives the first response information on the second target feedback resource unit, and the first response information is 1 (i.e., ACK information), it can be determined that the target response result of the terminal is the response result of receiving the first response message on the second target feedback resource unit, namely 1.

In a second way, after receiving a preset quantity of first response information or a preset proportion of first response information, the response result with the largest number of occurrences among the response results corresponding to the preset quantity of first response information is used as the target response result of the terminal. The preset proportion includes a ratio of the preset quantity to the quantity of the plurality of target feedback resource units, and the preset quantity may be the quantity of the first response information transmitted by the terminal on some or all of the plurality of target feedback resource units. The preset proportion may be a ratio of the quantity of the first response information transmitted by the terminal on some or all of the plurality of target feedback resource units to the quantity of the plurality of target feedback resource units.

For example, still taking the terminal transmitting the first response information on four target feedback resource units as an example, assuming that the preset quantity is 3, or the preset proportion is 75% (that is, the base station receives the first response information transmitted on three target feedback resource units by the terminal), if the first response information received on the first target feedback resource unit by the base station is 0 (i.e., NACK information), the first response information received on the second target feedback resource unit is 1, and the first response information received on the third target feedback resource unit is 1, then the quantity of the received first response information meets the preset quantity or the preset proportion, and the response result with the largest number of occurrences is determined to be 1, such that it is determined that the target response result of the terminal is 1.

For another example, assuming that the preset quantity is 4, or the preset proportion is 100% (that is, the base station receives the first response information transmitted by the terminal on all target feedback resource units), if the first response information received by the base station on the first target feedback resource unit is 0, the first response information received on the second target feedback resource unit is 1, and the first response information received on the third target feedback resource unit is 1, and the first response information received on the fourth target feedback resource unit is 1, then the quantity of the received first response information meets the preset quantity or the preset proportion, and the response result with the largest number of occurrences is determined to be 1, such that the target response result of the terminal is determined to be 1.

It should be noted that when 1 and 0 have the same number of occurrences, the target response result may be ACK information or NACK information. If the base station determines that the target response result of the terminal is 1 (i.e., ACK information) and the base station determines that the terminal receives the correct downlink data, but actually the downlink data received by the terminal may be wrong, in this case, since the base station has determined that the terminal has received the correct downlink data, the downlink data is not retransmitted to the terminal, and it is impossible for the terminal to obtain the correct downlink data. In order to solve this problem, in this embodiment, it is determined that the target response result of the terminal is 0 (i.e., NACK information). In this way, when 1 and 0 have the same number of occurrences, regardless of the actual target response result of the terminal being 0 or 1, the base station determines that the target response result is 0, and the downlink data is re-transmitted, so as to prevent the terminal from being unable to obtain the correct downlink data.

In a third way, after receiving the preset quantity of first response information or the preset proportion of first response information, an AND operation is performed on the response results corresponding to the preset quantity of first response information, and an operation result is determined as the target response result of the terminal.

For example, still taking the terminal transmitting the first response information on four target feedback resource units as an example, assume that the preset quantity is 3, or the preset proportion is 75% (that is, the base station receives the first response information transmitted on three feedback resource units by the terminal). If the first response information received on the first target feedback resource unit by the base station is 1, the first response information received on the second target feedback resource unit is 1, and the first response information received on the third target feedback resource unit is 1, in this case, the quantity of the received first response information meets the preset quantity or the preset proportion, and the AND operation is performed on the response results of the first response information received on the three different target feedback resource units to obtain the operation result which is 1, and then it is determined that the target response result of the terminal is 1.

For another example, assuming that the preset quantity is 4, or the preset proportion is 100% (that is, the base station receives the first response information transmitted by the terminal on all target feedback resource units), if the first response information received on the first target feedback resource unit by the base station is 0, the first response information received on the second target feedback resource unit is 1, the first response information received on the third target feedback resource unit is 1, and the first response information received on the fourth target feedback resource unit is 1, in this case, the quantity of the received first response information meets the preset quantity or the preset proportion, and the AND operation is performed on the response results of the first response information received on the four different target feedback resource units to obtain the operation result which is 0, then it is determined that the target response result of the terminal is 0.

In the above method, the base station can configure feedback resource configuration information for the terminal, and the terminal determines the plurality of target feedback resource units according to the feedback resource configuration information, such that the first response information corresponding to the downlink resource range is transmitted to the base station on the plurality of target feedback resource units. In the present disclosure, the first response information can be transmitted for several times through the plurality of target feedback resource units. In this way, even if there is a resource unit whose uplink transmission is blocked in the plurality of target feedback resource units, the uplink feedback can be realized on the other target feedback resource units.

Figure 2:
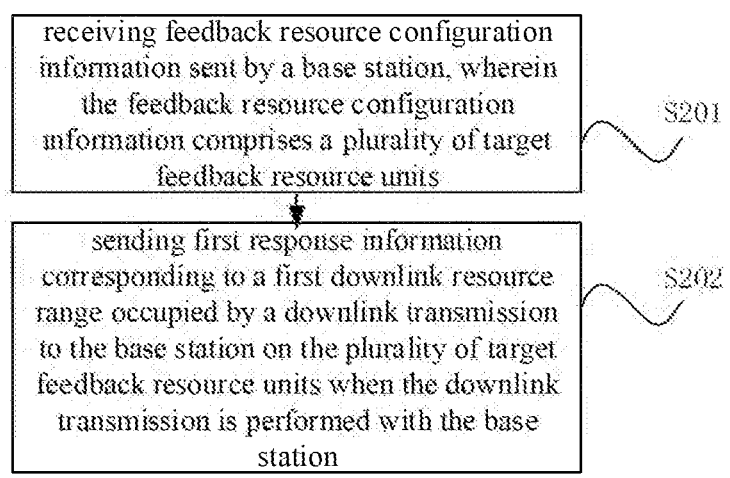
FIG. 2 is a flowchart of a method for transmitting information according to another embodiment of the disclosure.

FIG. 2 is a flowchart of a method for transmitting information according to an embodiment of the disclosure. As illustrated in FIG. 2, the method is applicable to a terminal. The method includes the following steps.

At block S201, feedback resource configuration information transmitted by a base station is received, in which the feedback resource configuration information includes a plurality of target feedback resource units. At this block, the base station may broadcast the feedback resource configuration information through a broadcast signaling, the base station may also send the feedback resource configuration information through a RRC message, the base station may also send the feedback resource configuration information through a MAC CE signaling, and the base station may also send the feedback resource configuration information through a physical layer signaling.

At block S202, first response information corresponding to a first downlink resource range occupied by a downlink transmission is transmitted to the base station on the plurality of target feedback resource units when the downlink transmission is performed with the base station. The first response information may be ACK/NACK information. ACK information means that downlink data is received correctly, and NACK information means that the downlink data is received incorrectly. When the base station receives the NACK information, the downlink data within the downlink resource range corresponding to the NACK information needs to be retransmitted. The ACK/NACK information can be identified by an identification bit, for example, the ACK information is represented by 1, and the NACK information is represented by 0.

It should be noted that there may be multiple response information on the target feedback resource unit, for example, on the target feedback resource unit, the terminal needs to send multiple response information for different downlink resource ranges to the base station, thereby increasing signaling cost. In order to solve the above problem, in another possible implementation of this embodiment, on any target feedback resource unit of the plurality of target feedback resource units, if there is second response information corresponding to a second downlink resource range, an AND operation is performed on the first response information and the second response information to obtain combined response information, and the combined response information is transmitted to the base station. A third downlink resource range corresponding to the combined response information includes the first downlink resource range and the second downlink resource range, so that the terminal only needs to send the combined response information after the AND operation, thereby reducing data volume to be transmitted, reducing signaling cost, and improving information transmission efficiency.

For example, taking the first response information and the second response information being ACK/NACK information as an example, in which the ACK information is represented by 1 and the NACK information is represented by 0, if the first response information is 0, and the second response information is 1, the combined response information after the AND operation (equivalent to multiplication operation) is 0. If the first response information is 0 and the second response information is 0, then the combined response information after the AND operation is 0; if the first response information is 1, and the second response information is 0, the combined response information after the AND operation is 0. If the first response information is 1 and the second response information is 1, then the combined response information after the AND operation is 1. In this way, when the combined response information is 1, it means that the downlink data corresponding to the first downlink resource range and the downlink data corresponding to the second downlink resource range are received correctly. When the combined response information is 0, it means that the downlink data corresponding to the first downlink resource range and/or the downlink data corresponding to the second downlink resource range is received incorrectly. In this way, when the base station receives the combined response information, if it determines that the combined response information is 0, the downlink data within the third downlink resource range needs to be retransmitted. That is, the downlink data corresponding to the first downlink resource range and the downlink data corresponding to the second downlink resource range both need to be retransmitted.

With the above method, the terminal can determine the plurality of target feedback resource units according to the feedback resource configuration information transmitted by the base station, thereby transmitting the first response information corresponding to the downlink resource range to the base station on the plurality of target feedback resource units. In the present disclosure, the first response information can be transmitted for several times on the plurality of target feedback resource units. In this way, even if there is a resource unit whose uplink transmission is blocked in the plurality of target feedback resource units, the uplink feedback can be realized on the other target feedback resource units.

Figure 3:
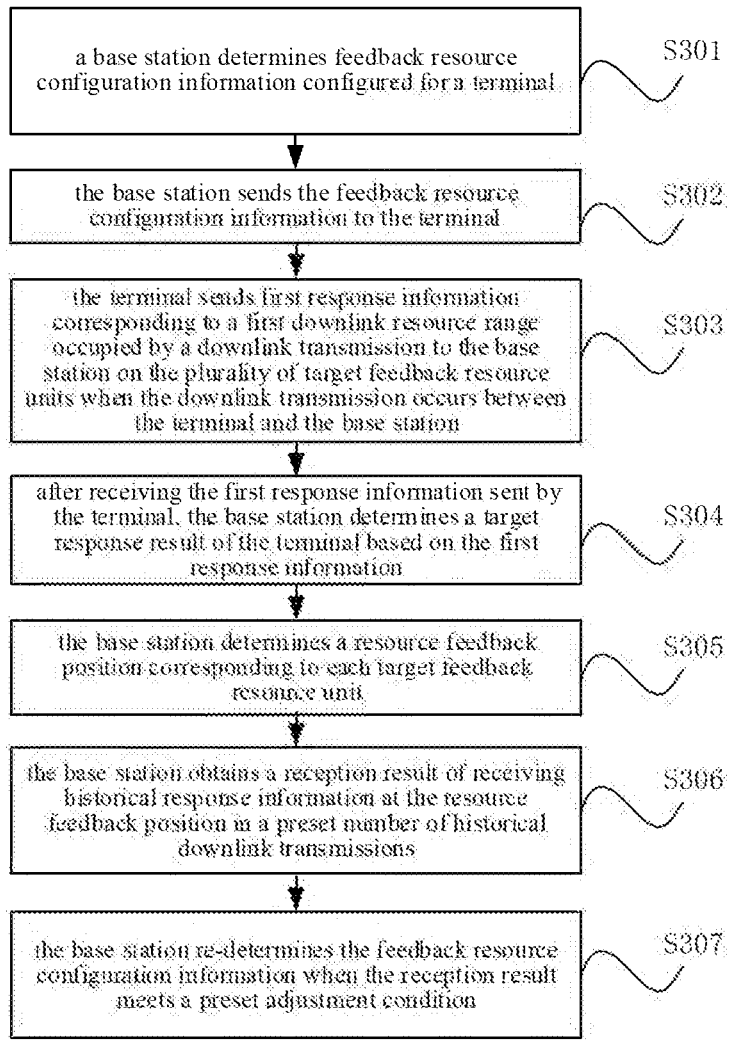
FIG. 3 is a flowchart of a method for transmitting information according to a further embodiment of the disclosure.

FIG. 3 is a flowchart of a method for transmitting information according to an embodiment of the disclosure. As illustrated in FIG. 3, the method includes the following steps.

Figure 4:
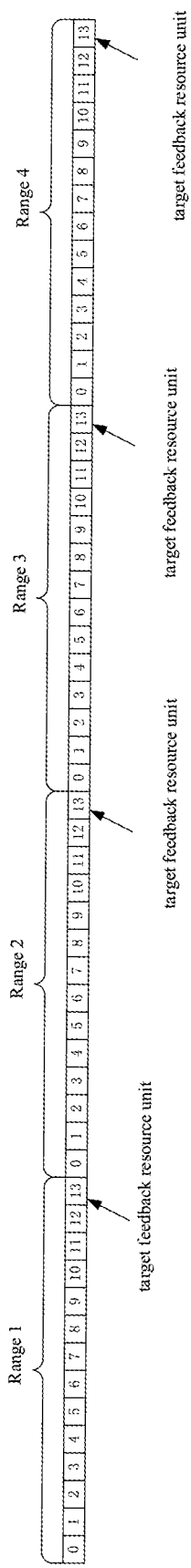
FIG. 4 is a schematic diagram of a downlink resource range according to an embodiment of the disclosure.

At block S301, a base station determines feedback resource configuration information configured for a terminal. In this block, the feedback configuration information may include a plurality of target feedback resource units, and the plurality of target feedback resource units may be determined in any of the following two ways. In a first way, a plurality of preset uplink feedback resource units may be determined as the plurality of target feedback resource units to obtain the feedback resource configuration information. For example, the base station may configure the last resource unit of four consecutive downlink resource ranges starting from a first downlink resource range as the target feedback resource units. For example, as illustrated in FIG. 4, taking four consecutive downlink resource ranges in which the resource unit is denoted as a symbol as an example, the four consecutive downlink resource ranges are respectively denoted as range 1, range 2, range 3, and range 4. Range 1 may be the first downlink resource range, and each downlink resource range includes 14 symbols from symbol 0 to symbol 13, such that symbol 13 in each downlink resource range is used as the target feedback resource unit.

In second way, a target feedback resource unit set is determined from a plurality of preset feedback resource unit sets, and the plurality of uplink feedback resource units in the target feedback resource unit set are determined as the plurality of target feedback resource units.

The feedback resource unit set includes a plurality of uplink feedback resource units, and different feedback resource unit sets have different uplink feedback resource units. For example, still taking four continuous downlink resource ranges in which the resource unit is denoted as a symbol as an example, the four continuous downlink resource ranges are sequentially denoted as range 1, range 2, range 3, and range 4. The plurality of preset feedback resource unit sets include set 1 and set 2. Set 1 includes symbol 13 of range 1, symbol 13 of range 2, symbol 13 of range 3 and symbol 13 of range 4, thus set 1 indicates that the resource units configured by the base station for the terminal to send first response information are symbol 13 in range 1, symbol 13 in range 2, symbol 13 in range 3, and symbol 13 in range 4. That is, after receiving the feedback resource configuration information, the terminal transmits the first response information corresponding to the first downlink resource range on symbol 13 in range 1, symbol 13 in range 2, symbol 13 in range 3, and symbol 13 in range 4, respectively. Set 2 includes symbol 13 of range 1, symbol 13 of range 2, and symbol 13 of the range 4. Set 1 represents that the uplink feedback resource units configured by the base station for the terminal to send the first response information are symbol 13 in range 1, symbol 13 in range 2, and symbol 13 in range 4. That is, after receiving the feedback resource configuration information, the terminal transmits the first response information corresponding to the first downlink resource range on symbol 13 in range 1, symbol 13 in range 2, and symbol 13 in range 4, respectively. The base station may use set 1 or set 2 as the target feedback resource unit set. For example, set 1 may be used as the target feedback resource unit set, and the plurality of uplink feedback resource units in set 1 may be used as the plurality of target feedback resource units. When set 1 is used as the target feedback resource unit set, the target feedback resource units are the target feedback resource units shown in FIG. 4 as described in way 1. Certainly, the above set 1 and set 2 are just examples for description, which are not limited in this disclosure.

At block S302, the base station transmits the feedback resource configuration information to the terminal. In this block, the base station may broadcast the feedback resource configuration information through a broadcast signaling, the base station may also send the feedback resource configuration information through a RRC message, the base station may also send the feedback resource configuration information through a MAC CE signaling, and the base station can also send the feedback resource configuration information through a physical layer signaling.

At block S303, the terminal transmits first response information corresponding to a first downlink resource range occupied by a downlink transmission to the base station on the plurality of target feedback resource units when the downlink transmission occurs between the terminal and the base station. The first response information may be ACK/NACK information. ACK information means that downlink data is received correctly, and NACK information means that the downlink data is received incorrectly. When the base station receives the NACK information, the downlink data in the downlink resource range corresponding to the NACK information needs to be retransmitted. The ACK/NACK information can be identified by an identification bit. For example, the ACK information is represented by 1 and the NACK information is represented by 0.

It should be noted that there may be multiple response information on the target feedback resource unit, for example, on the target feedback resource unit, the terminal needs to send multiple response information for different downlink resource ranges to the base station, thereby increasing signaling cost. In order to solve the above problem, in another possible implementation of this embodiment, on any target feedback resource unit from the plurality of target feedback resource units, if there is second response information corresponding to a second downlink resource range, an AND operation is performed on the first response information and the second response information to obtain combined response information, and the combined response information is transmitted to the base station. A third downlink resource range corresponding to the combined response information includes the first downlink resource range and the second downlink resource range, so that the terminal only needs to send the combined response information after the AND operation, thereby reducing data volume to be transmitted, reducing signaling cost and improving information transmission efficiency.

For example, taking the first response information and the second response information being ACK/NACK information as an example, the ACK information may be represented by 1, the NACK information may be represented by 0, and if the first response information is 0, the second response information is 1, the combined response information after the AND operation (equivalent to multiplication operation) is 0. If the first response information is 0 and the second response information is 0, then the combined response information after the AND operation is 0; if the first response information is 1, and the second response information is 0, then the combined response information after the AND operation is 0; if the first response information is 1, and the second response information is 1, then the combined response information after the AND operation is 1. In this way, when the combined response information is 1, it means that the downlink data corresponding to the first downlink resource range and the downlink data corresponding to the second downlink resource range are received correctly, and when the combined response information is 0, it means that the downlink data corresponding to the first downlink resource range and/or the downlink data corresponding to the second downlink resource range is received incorrectly. Thus, when the base station receives the combined response information, if it is determined that the combined response information is 0, the downlink data corresponding to the third downlink resource range needs to be retransmitted. That is, the downlink data corresponding to the first downlink resource range and the downlink data corresponding to the second downlink resource range both need to be retransmitted.

At block S304, after receiving the first response information transmitted by the terminal, the base station determines a target response result of the terminal based on the first response information. The target response result of the terminal may be determined in any of the following three ways.

In a first way, the target response result of the terminal is determined based on the earliest received first response information. For example, taking the terminal transmitting the first response information on four target feedback resource units as an example, when the base station does not receive the first response information on the first target feedback resource unit but receives the first response information on the second target feedback resource unit, and the first response information is 1 (i.e., ACK message), it is determined that the target response result of the terminal is the response result of receiving the first response message on the second target feedback resource unit, namely 1.

In second way, after receiving a preset quantity of first response information or a preset proportion of first response information, a response result with the largest number of occurrences from response results corresponding to the preset quantity of first response information is determined as the target response result of the terminal. The preset proportion includes a ratio of the preset quantity to the quantity of the plurality of target feedback resource units, and the preset quantity may be the quantity of the first response information transmitted by the terminal on some or all of the plurality of target feedback resource units. The preset proportion may be a ratio of the quantity of the first response information transmitted by the terminal on some or all of the plurality of target feedback resource units to the quantity of the plurality of target feedback resource units.

For example, still taking the terminal transmitting the first response information on four target feedback resource units as an example, assuming that the preset quantity is 3, or the preset proportion is 75% (that is, the base station receives the first response information transmitted on three target feedback resource units by the terminal), if the first response information received by the base station on the first target feedback resource unit is 0, the first response information received on the second target feedback resource unit is 1, and the first response information received on the third target feedback resource unit is 1, in this case, the quantity of the received first response information meets the preset quantity or the preset proportion, and it is determined that the response result with the largest number of occurrences is 1, then it is determined that the target response result of the terminal is 1.

For example, assuming that the preset quantity is 4, or the preset proportion is 100% (that is, the base station receives the first response information transmitted by the terminal on all target feedback resource units), if the first response information received by the base station on the first target feedback resource unit is 0, the first response information received on the second target feedback resource unit is 1, the first response information received on the third target feedback resource unit is 1, and the first response information received on the fourth target feedback resource unit is 1, in this case, the quantity of the received first response information meets the preset quantity or the preset proportion, and the response result with the largest number of occurrences is determined to be 1, then the target response result of the terminal is determined to be 1.

It should be noted that when 1 and 0 have the same number of occurrences, the target response result may be ACK information or NACK information. If the base station determines that the target response result of the terminal is 1 (i.e., ACK information) and the base station considers that the terminal receives the correct downlink data, but the downlink data actually received by the terminal may be wrong, in this case, since the base station has determined that the terminal has received the correct downlink data, the downlink data will not be retransmitted to the terminal, then it is impossible for the terminal to obtain the correct downlink data. In order to solve this problem, in this embodiment, it is determined that the target response result of the terminal is 0 (i.e., NACK information). In this way, when 1 and 0 have the same number of occurrences, regardless of the actual target response result of the terminal being 0 or 1, the base station determines that the target response result is 0, and the downlink data will be retransmitted, so as to prevent the terminal from being unable to obtain the correct downlink data.

In third way, after receiving the preset quantity of first response information or the preset proportion of first response information, an AND operation is performed on the response results corresponding to the preset quantity of the first response information, and an operation result is determined as the target response result of the terminal.

For example, continue to take the terminal transmitting the first response information on four target feedback resource units as an example, assume that the preset quantity is 3, or the preset proportion is 75% (that is, the base station receives the first response information transmitted by the terminal on three target feedback resource units). If the first response information received by the base station on the first target feedback resource unit is 1, the first response information received on the second target feedback resource unit is 1, and the first response information received on the third target feedback resource unit is 1, in this case, the quantity of the received first response information meets the preset quantity or the preset proportion, and the AND operation is performed on the response results of the first response information received on the three different target feedback resource units to obtain the operation result which is 1, then it is determined that the target response result of the terminal is 1.

For another example, assuming that the preset quantity is 4, or the preset proportion is 100% (that is, the base station receives the first response information transmitted by the terminal on all target feedback resource units), if the first response information received on the first target feedback resource unit by the base station is 0, the first response information received on the second target feedback resource unit is 1, the first response information received on the third target feedback resource unit is 1, and the first response information received on the fourth target feedback resource unit is 1, in this case, the quantity of the received first response information meets the preset quantity or the preset proportion, and the AND operation performed on the response results of the first response information received on the four different target feedback resource units to obtain the operation result which is 0, and then it is determined that the target response result of the terminal is 0.

At block S305, for each target feedback resource unit, the base station determines a resource feedback position corresponding to the target feedback resource unit. The resource feedback position may be determined according to a time sequence of receiving the first response information transmitted by the terminal on the target feedback resource units.

For example, taking four downlink resource ranges as an example, the four downlink resource ranges are denoted as range 1, range 2, range 3, and range 4, respectively, range 1 may be the first downlink resource range, and each downlink resource range includes 14 symbols, which are symbol 0 to symbol 13, and symbol 13 in each downlink resource range is the target feedback resource unit. Firstly, the base station receives the first response information transmitted by the terminal on symbol 13 in range 1, such that the resource feedback position of symbol 13 in range 1 is determined to be position 1. Secondly, the base station receives the first response information transmitted by the terminal on symbol 13 in range 2, such that the resource feedback position of symbol 13 in the range 2 is position 2. Thirdly, the base station receives the first response information transmitted by the terminal on symbol 13 in range 3, such that the resource feedback position of symbol 13 in range 3 is determined as position 3. Lastly, the base station receives the first response information transmitted by the terminal on symbol 13 in range 4, such that it is determined that the resource feedback position of the symbol 13 in range 4 is position 4.

At block S306, the base station obtains a reception result of receiving historical response information at the resource feedback position in a preset number of historical downlink transmissions. The reception result indicates whether the history response information is received. In this block, the base station records whether the historical response information is received at each resource feedback position during the historical downlink transmission. For example, taking three historical downlink transmissions (equivalent to the preset number of transmissions) as an example, the three historical downlink transmissions are recorded as downlink transmission 1, downlink transmission 2, and downlink transmission 3. Each historical downlink transmission includes four continuous downlink resource ranges, and each downlink resource range includes 14 symbols, which are denoted as symbol 1 to symbol 13, and symbol 13 in each downlink resource range is the target feedback resource unit. In this way, for the target feedback resource unit in the downlink resource range of each historical downlink transmission, corresponding position 1 to position 4 may be determined in the manner described at block S306, and the reception result of the historical response information at each position is obtained.

At block S307, the base station re-determines the feedback resource configuration information when the reception result meets a preset adjustment condition. The preset adjustment condition may include any one of the following two conditions.

In condition 1, a number of failures to receive the historical response information at at least one resource feedback position is greater than or equal to a first preset number. The failure to receive the historical response information may be that the historical response information is not received within a preset time period.

For example, still taking the above three historical downlink transmissions as an example, assuming that the first preset number is 2, if the base station determines that the historical response information is successfully received at position 3 in the downlink transmission 1, the historical response information is unsuccessfully received at position 3 in the downlink transmission 2, and the historical response information is unsuccessfully received at position 3 in the downlink transmission 3, then it is determined that the number of failures to receive the historical response information at location 3 in the historical downlink transmission reaches 2, and the base station re-determines the feedback resource configuration information.

In condition 2, in the preset number of historical downlink transmissions, a total number of failures to receive the historical response information is greater than or equal to a second preset number. For example, still taking the above three historical downlink transmissions as an example, assuming that the second preset number is 3, if the base station determines that the historical response information is unsuccessfully received at locations 1 and 2 but successfully received at locations 3 and 4 in the downlink transmission 1, the historical response information is unsuccessfully received at location 1 but successfully received at location 2, location 3, and location 4 in the downlink transmission 2, and the historical response information is unsuccessfully received at location 4 but successfully received at position 1, position 2, and position 3 in downlink transmission 3, then it is determined that the total number of failures to receive the historical response information in the three downlink transmissions is 4, which is greater than the second preset number, and the base station re-determines the feedback resource configuration information.

The base station re-determines the feedback resource configuration information in any of the following two ways.

In a first way, a new target feedback resource unit set is determined from a plurality of preset feedback resource unit sets to obtain the re-determined feedback resource configuration information. In this way, if the base station adopts the first way described in block S301 to determine the plurality of uplink feedback resource units, the new target feedback resource unit set may be re-determined from the plurality of feedback resource unit sets, and the uplink feedback resource units in the new target feedback resource unit set are configured as the target feedback resource units in the feedback resource configuration information. For example, the set 2 exemplified in the first way described in block S301 is used as the new target feedback resource unit set.

In a second way, a preset initial resource feedback position and a preset back-off algorithm are determined, and a plurality of target resource feedback positions are obtained based on the preset initial resource feedback position and the preset back-off algorithm, and resource units at a plurality of target resource feedback positions are determined as new target feedback resource units to obtain the re-determined feedback resource configuration information.

In a possible implementation, a number determining step is repeatedly performed until a plurality of numbers of back-off resources are obtained, and the plurality of target resource feedback positions are obtained based on the preset initial resource feedback position and the plurality of numbers of back-off resources.

The number determining step can include determining the $n^{th}$ target resource feedback position; obtaining the $n^{th}$ target resource range position based on a back-off formula, and adding 1 to n. The back-off formula is $M=N*2^{n-1}$; or, $M=N*2n$, where M is the number of back-off resources, and N is the number of resource units within the first downlink resource range.

Figure 5:
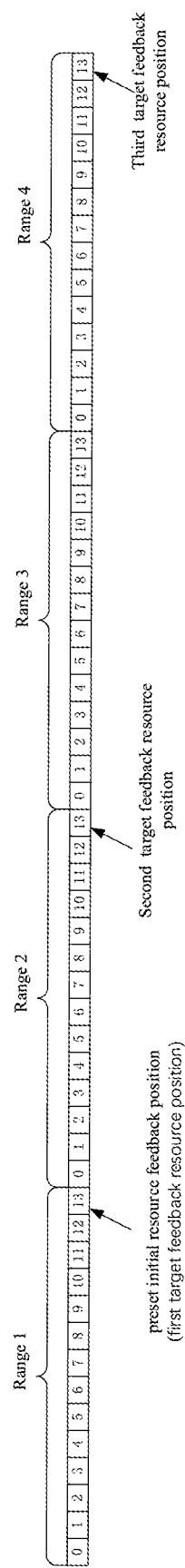
FIG. 5 is a schematic diagram of another downlink resource range according to an embodiment of the disclosure.

For example, as illustrated in FIG. 5, it is necessary to re-determine three target resource feedback positions, and the back-off formula is $M=N*2^{n-1}$. As illustrated in FIG. 5, four continuous downlink resource ranges are denoted as range 1, range 2, range 3 and range 4 respectively. Each downlink resource scope includes 14 symbols, which are symbol 0 to symbol 13. The position of symbol 13 in range 1 is determined as the preset initial resource feedback position. The position which is preset can be considered as the first target feedback resource position, such that there are two target resource feedback positions to be calculated. When calculating the first one of the two target resource feedback positions to be calculated, n in the above formula is configured as 1, then the number M of back-off resources is determined as 14 by the formula $M=N*2^{n-1}$, so that the first one of the two target resource feedback positions (i.e., the second target resource feedback position) to be calculated is the position back-off from the preset initial resource feedback position by 14 symbols, which is the position of symbol 13 in range 2 illustrated in FIG. 5. Similarly, when calculating the second one of the two target resource feedback positions to be calculated, n in the above formula is configured as 2, then the number M of back-off resources is determined as 28 through the formula $M=N*2^{n-1}$. The position back-off from the preset initial resource feedback position by 28 symbols is configured as the second one of the two target resource feedback positions to be calculated, i.e., the third target resource feedback position, which is the position of symbol 13 of range 4 as illustrated in FIG. 5. In this way, three target resource feedback positions are obtained. Certainly, the above examples are only illustrative, which are not limited in the present disclosure.

After obtaining the plurality of target resource feedback positions, a plurality of resource units at the target unit positions are used as new target feedback resource units to obtain re-determined feedback resource configuration information. After obtaining the new feedback resource configuration information, the new feedback resource configuration information is transmitted to the terminal, so that the terminal subsequently transmits the first response information on the plurality of target feedback resource units configured in the new feedback resource configuration information.

In this way, through the above steps S305 to S307, when the success rate of the base station receiving the first response information transmitted by the terminal is low, the new feedback resource configuration information is determined, so that the terminal transmits the first response information on the plurality of new target feedback resource units to improve the success rate of receiving the first response information by the base station.

It should be noted that for the sake of simple description, the foregoing method embodiments are all expressed as a series of action combinations, but those skilled in the art should know that the present disclosure is not limited by the described sequence of actions, in the present disclosure, certain steps may be performed in other order or simultaneously. Secondly, those skilled in the art should also know that the embodiments described in the specification are all preferred embodiments, and the actions and modules involved are not necessarily required by the present disclosure.

With the above method, the base station may configure feedback resource configuration information for the terminal, and the terminal determines the plurality of target feedback resource units according to the feedback resource configuration information, thereby transmitting the first response information corresponding to the downlink resource range to the base station on the plurality of target feedback resource units. In the present disclosure, the first response information can be transmitted for many times through the plurality of target feedback resource units. In this way, even if there is a resource unit whose uplink transmission is blocked in the plurality of target feedback resource units, the uplink feedback can be realized on the other target feedback resource units.

Figure 6:
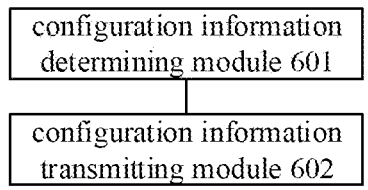
FIG. 6 is a schematic diagram of an apparatus for transmitting information according to an embodiment of the disclosure.

FIG. 6 is a schematic diagram of an apparatus for transmitting information according to an embodiment of the disclosure. As illustrated in FIG. 6, the apparatus is applicable to a base station, the apparatus can include a configuration information determining module 601 and a configuration information transmitting module 602. Of course, it should be understood that one or more of the modules described in this disclosure can be implemented by hardware, such as circuitry.

The configuration information determining module 601 is configured to determine feedback resource configuration information configured for a terminal, in which the feedback resource configuration information includes a plurality of target feedback resource units. The configuration information transmitting module 602 is configured to send the feedback resource configuration information to the terminal, such that the terminal transmits first response information corresponding to a first downlink resource range occupied by a downlink transmission to the base station on the plurality of target feedback resource units when the downlink transmission occurs between the terminal and the base station.

Alternatively, the configuration information determining module 601 can be configured to determine a plurality of preset uplink feedback resource units as the plurality of target feedback resource units to obtain the feedback resource configuration information. Further, the configuration information determining module 601 is configured to determine a target feedback resource unit set from a plurality of preset feedback resource unit sets each including a plurality of uplink feedback resource units; and determine a plurality of uplink feedback resource units in the target feedback resource unit set as the plurality of target feedback resource units, in which different feedback resource unit sets have different uplink feedback resource units.

Figure 7:
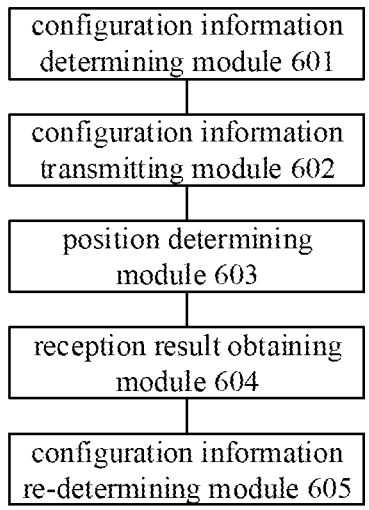
FIG. 7 is a schematic diagram of an apparatus for transmitting information according to another embodiment of the disclosure.

Alternatively, as illustrated in FIG. 7, the apparatus includes: a position determining module 603, a reception result obtaining module 604 and a configuration information re-determining module 605. The position determining module 603 is configured to determine a resource feedback position corresponding to each target feedback resource unit after the feedback resource configuration information is transmitted to the terminal. The reception result obtaining module 604 is configured to obtain a reception result of receiving historical response information at the resource feedback position in a preset number of historical downlink transmissions. The configuration information re-determining module 605 is configured to re-determine the feedback resource configuration information when the reception result meets a preset adjustment condition.

Alternatively, the preset adjustment condition includes: a number of failures to receive the historical response information at at least one resource feedback position being greater than or equal to a first preset number; or, in the preset number of historical downlink transmissions, a total number of failures to receive the historical response information being greater than or equal to a second preset number.

Alternatively, the configuration information re-determining module 605 is configured to re-determine a new target feedback resource unit set from a plurality of preset feedback resource unit sets, and obtain the re-determined feedback resource configuration information. Additionally, the configuration information re-determining module 605 is configured to determine a preset initial resource feedback position and a preset back-off algorithm, obtain a plurality of target resource feedback positions based on the preset initial resource feedback position and the preset back-off algorithm, and determine resource units at a plurality of target resource feedback positions as new target feedback resource units to obtain the re-determined feedback resource configuration information.

Alternatively, the configuration information re-determining module 605 is configured to sequentially perform a number determining step until a plurality of numbers of back-off resources are obtained, and obtain the plurality of target resource feedback positions based on the preset initial resource feedback position and the plurality of numbers of back-off resources.

The number determining step can include determining the $n^{th}$ target resource feedback position; obtaining the $n^{th}$ target resource range position based on a back-off formula, and adding 1 to n, in which the back-off formula is $M=N*2^{n-1}$, or, $M=N*2n$, where M is the number of back-off resources, and N is the number of resource units within the first downlink resource range.

Figure 8:
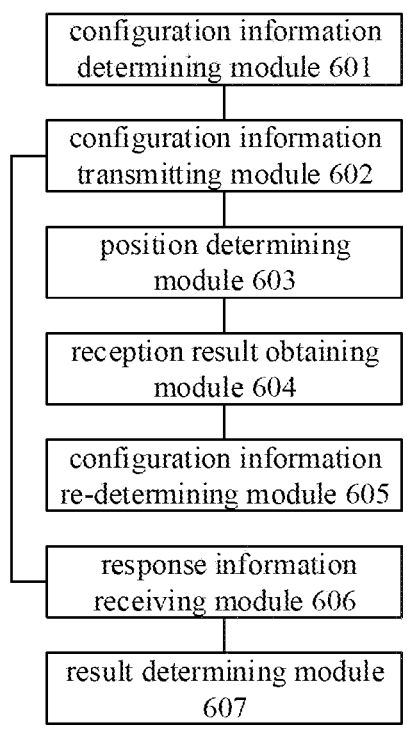
FIG. 8 is a schematic diagram of an apparatus for transmitting information according to a further embodiment of the disclosure.

Alternatively, as illustrated in FIG. 8, the apparatus can include a response information receiving module 606 and a result determining module 607. The response information receiving module 606 is configured to receive the first response information transmitted by the terminal on the plurality of target feedback resource units after the feedback resource configuration information is transmitted to the terminal. The result determining module 607 is configured to determine a target response result of the terminal based on the first response information. Further, the result determining module 607 is configured to determine the target response result of the terminal based on the earliest received first response information. Or, the result determining module 607 is configured to, after receiving a preset quantity of first response information or a preset proportion of first response information, determine a response result with the largest number of occurrences from response results corresponding to the preset quantity of first response information as the target response result of the terminal, in which the preset proportion includes a ratio of the preset quantity to a quantity of the target feedback resource units. Or, the result determining module 607 is configured to, after receiving the preset quantity of first response information or the preset proportion of first response information, perform an AND operation on the response results corresponding to the preset quantity of first response information, and determine an operation result as the target response result of the terminal.

Alternatively, the configuration information transmitting module 602 is configured to broadcast the feedback resource configuration information through a broadcast signaling; or, the configuration information transmitting module 602 is configured to send the feedback resource configuration information through a radio resource control (RRC) message; or, the configuration information transmitting module 602 is configured to send the feedback resource configuration information through a media access control control element (MAC CE) signaling; or the configuration information transmitting module 602 is configured to send the feedback resource configuration information through a physical layer signaling.

With the above apparatus, it is possible to configure feedback resource configuration information for the terminal, and the terminal determines the plurality of target feedback resource units according to the feedback resource configuration information, so that the first response information corresponding to the downlink resource range is transmitted to the base station on the plurality of target feedback resource units. In the present disclosure, the first response information can be transmitted for multiple times on the plurality of target feedback resource units. In this way, even if there is a resource unit whose uplink transmission is blocked in the plurality of target feedback resource units, the uplink feedback is performed on the other target feedback resource units.

Figure 9:
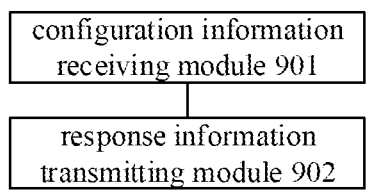
FIG. 9 is a schematic diagram of an apparatus for transmitting information according to a still embodiment of the disclosure.

FIG. 9 is a schematic diagram of an apparatus for transmitting information according to an embodiment of the disclosure. As illustrated in FIG. 9, the apparatus is applicable to a terminal. The apparatus includes: a configuration information receiving module 901 and a response information transmitting module 902. The configuration information receiving module 901 is configured to receive feedback resource configuration information transmitted by a base station, in which the feedback resource configuration information includes a plurality of target feedback resource units.

The response information transmitting module 902 is configured to send first response information corresponding to a first downlink resource range occupied by a downlink transmission to the base station on the plurality of target feedback resource units when the downlink transmission is performed with the base station.

Alternatively, the response information transmitting module 902 is configured to perform an AND operation on the first response information and second response information to obtain combined response information when the second response information corresponding to a second downlink resource range exists on any one of the plurality of target feedback resource units, and send the combined response information to the base station, in which a third downlink resource range corresponding to the combined response information includes the first downlink resource range and the second downlink resource range.

With the above apparatus, the plurality of target feedback resource units are determined according to the feedback resource configuration information transmitted by the base station, so that the first response information corresponding to the downlink resource range is transmitted to the base station on the plurality of target feedback resource units. In the present disclosure, the first response information can be transmitted for multiple times on the plurality of target feedback resource units. In this way, even if there is a resource unit whose uplink transmission is blocked in the plurality of target feedback resource units, the uplink feedback is performed on the other target feedback resource units.

It should be noted that, for the specific description of each module of the above-mentioned apparatus, reference may be made to the relevant description of the foregoing method for transmitting information, which is not repeated here.

Figure 10:
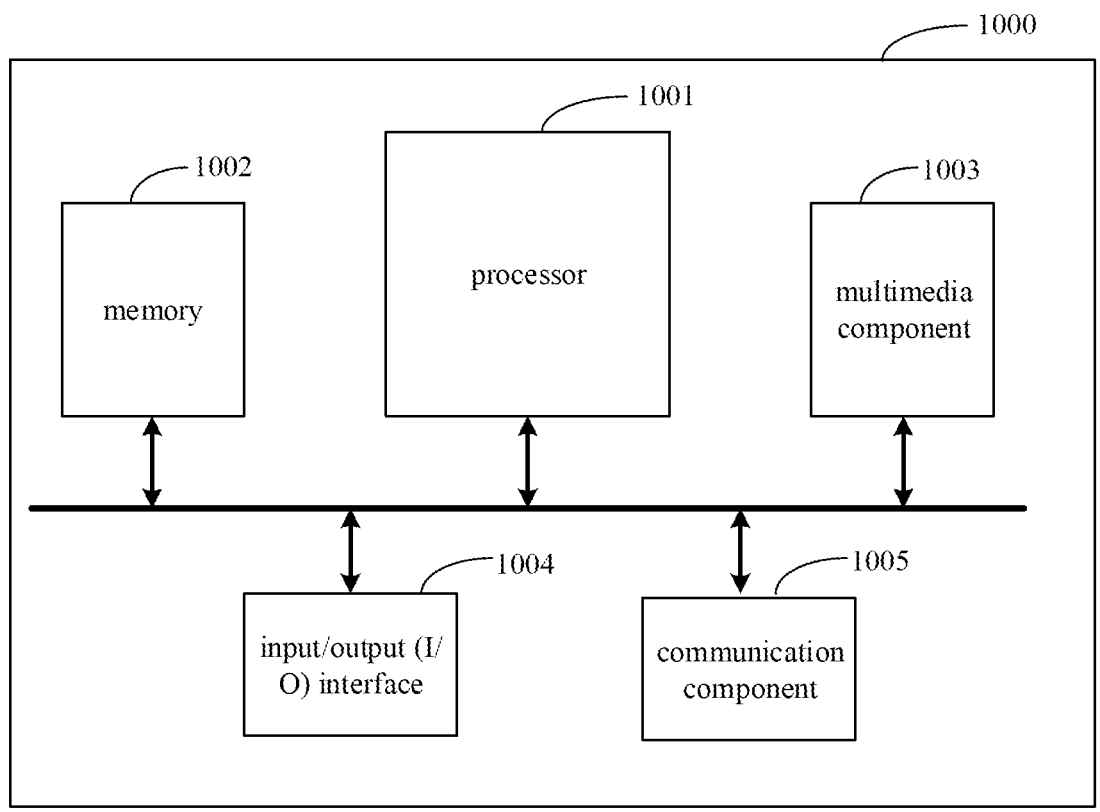
FIG. 10 is a schematic diagram of a terminal according to an embodiment of the disclosure.

FIG. 10 is a schematic diagram of a terminal according to an embodiment of the disclosure. As illustrated in FIG. 10, the electronic device may be a base station or a terminal. The electronic device 1000 may include a processor 1001, a memory 1002, a multimedia component 1003, an input/output (I/O) interface 1004, and a communication component 1005.

The processor 1001 typically controls overall operations of the electronic device 1000, to complete all or part of the steps of the above method for transmitting information. The memory 1002 is configured to store various types of data to support operations on the electronic device 1000. For example, these data may include instructions for any application or method to operate on the electronic device 1000, and application-related data, such as contact data, messages transmitted and received, pictures, audio and video.

The memory 1002 is implemented by any type of volatile or non-volatile storage terminal device or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disk or optical disk. The multimedia component 1003 may include a screen and an audio component. The screen may be a touch screen, and the audio component is used to output and/or input audio signals. For example, the audio component may include a microphone, which is used to receive external audio signals. The received audio signal may be further stored in the memory 1002 or transmitted through the communication component 1005. The audio component also includes at least one speaker for outputting audio signals. The I/O interface 1004 provides an interface between the processor 1001 and other interface modules. The above-mentioned other interface modules may be keyboards, mice and buttons. These buttons are virtual buttons or physical buttons. The communication component 1005 is used for wired or wireless communication between the electronic device 1000 and other terminal devices. Wireless communication, such as Wi-Fi, Bluetooth, Near Field Communication (NFC), 2G, 3G, or 4G, or any combination, so the corresponding communication component 1005 may include: Wi-Fi module, Bluetooth module and NFC module.

In an exemplary embodiment, the electronic device 1000 may be used by one or more Application Specific Integrated Circuit (ASIC), Digital Signal Processor (DSP), and Digital Signal Processing Device (DSPD), Programmable Logic Device (PLD), Field Programmable Gate Array (FPGA), controller, microcontroller, microprocessor or other electronic component, to implement the above method of transmitting information.

In another exemplary embodiment, there is also provided a computer-readable storage medium including program instructions, when executed by a processor, the steps of the foregoing method for transmitting information is implemented. For example, the computer-readable storage medium may be the foregoing memory 1002 including program instructions, and the foregoing program instructions may be executed by the processor 1001 of the electronic device 1000 to complete the foregoing method for transmitting information.

The preferred embodiments of the present disclosure are described in detail above with reference to the accompanying drawings. However, the present disclosure is not limited to the specific details in the above-mentioned embodiments. Within the scope of the technical concept of the present disclosure, various simple modifications can be made to the technical solutions of the present disclosure. These simple modifications all belong to the protection scope of the present disclosure.

In addition, it should be noted that various specific technical features described in the above-mentioned specific embodiments are combined in any suitable manner without contradiction. In order to avoid unnecessary repetition, various possible combinations are not further described in this disclosure.

What is claimed is:

1. A method for transmitting information that is applicable to a base station, comprising:
   determining feedback resource configuration information that is configured for a terminal, the feedback resource configuration information including a plurality of target feedback resource units; and
   transmitting the feedback resource configuration information to the terminal, such that the terminal transmits first response information corresponding to a first downlink resource range occupied by a downlink transmission to the base station on the plurality of target feedback resource units when the downlink transmission occurs between the terminal and the base station;
   wherein, after transmitting the feedback resource configuration information to the terminal, the method further comprises:
   determining a resource feedback position corresponding to each target feedback resource unit;
   obtaining a reception result of receiving historical response information at the resource feedback position in a preset number of historical downlink transmissions; and re-determining the feedback resource configuration information when the reception result meets a preset adjustment condition,
wherein re-determining the feedback resource configuration information comprises:
determining a preset initial resource feedback position and a preset back-off algorithm;
obtaining a plurality of target resource feedback positions based on the preset initial resource feedback position and the preset back-off algorithm; and
determining resource units at the plurality of target resource feedback positions as new target feedback resource units to obtain the re-determined feedback resource configuration information;
wherein obtaining the plurality of target resource feedback positions further comprises:
sequentially performing a number determining step until a plurality of numbers of back-off resources are obtained; and
obtaining the plurality of target resource feedback positions based on the preset initial resource feedback position and the plurality of numbers of back-off resources, and
the number determining step further comprises:
determining the $n^{th}$, target resource feedback position; and
obtaining the $n^{th}$ target resource range position based on a back-off formula, and adding 1 to n, the back-off formula being $M=N*2^{n-n}$ or $M=N*2n$, where M is the number of back-off resources and N is the number of resource units within the first downlink resource range.

2. The method according to claim 1, wherein determining the feedback resource configuration information further comprises:
determining a plurality of preset uplink feedback resource units as the plurality of target feedback resource units to obtain the feedback resource configuration information.

3. The method according to claim 1, wherein determining the feedback resource configuration information further comprises:
determining a target feedback resource unit set from a plurality of preset feedback resource unit sets that each include a plurality of uplink feedback resource units; and
determining a plurality of uplink feedback resource units in the target feedback resource unit set as the plurality of target feedback resource units, wherein different feedback resource unit sets have different uplink feedback resource units.

4. The method according to claim 1, wherein the preset adjustment condition comprises:
a number of failures to receive the historical response information at at least one resource feedback position being greater than or equal to a first preset number; or
in the preset number of historical downlink transmissions, a total number of failures to receive the historical response information being greater than or equal to a second preset number.

5. The method according to claim 1, wherein re-determining the feedback resource configuration information further comprises:
determining a new target feedback resource unit set from a plurality of preset feedback resource unit sets; and
obtaining the re-determined feedback resource configuration information.

6. The method according to claim 1, wherein, after transmitting the feedback resource configuration information to the terminal, the method further comprising:
receiving the first response information transmitted by the terminal on the plurality of target feedback resource units; and
determining a target response result of the terminal based on the first response information.

7. The method according to claim 6, wherein determining the target response result of the terminal further comprises:
determining the target response result of the terminal based on an earliest received first response information;
determining a response result with the largest number of occurrences from response results corresponding to the preset quantity of first response information as the target response result of the terminal after receiving a preset quantity of first response information or a preset proportion of first response information, where the preset proportion is a ratio of the preset quantity to a quantity of the plurality of target feedback resource units; or
performing an AND operation on the response results corresponding to the preset quantity of first response information after receiving the preset quantity of first response information or the preset proportion of first response information, and determining an operation result as the target response result of the terminal.

8. The method according to claim 1, wherein transmitting the feedback resource configuration information to the terminal further comprises:
broadcasting the feedback resource configuration information through a broadcast signaling;
transmitting the feedback resource configuration information through a radio resource control (RRC) message;
transmitting the feedback resource configuration information through a media access control control element (MAC CE) signaling; or
transmitting the feedback resource configuration information through a physical layer signaling.

9. A method for transmitting information that is applicable to a terminal, comprising:
receiving feedback resource configuration information transmitted by a base station, the feedback resource configuration information including a plurality of target feedback resource units; and
transmitting first response information corresponding to a first downlink resource range occupied by a downlink transmission to the base station on the plurality of target feedback resource units when the downlink transmission is performed with the base station;
receiving re-determined feedback resource configuration information transmitted by the base station, wherein the re-determined feedback resource configuration information is determined by the base station by determining a resource feedback position corresponding to each target feedback resource unit, obtaining a reception result of receiving historical response information at the resource feedback position in a preset number of historical downlink transmissions; and re-determining the feedback resource configuration information when the reception result meets a preset adjustment condition;
wherein re-determining the feedback resource configuration information comprises:
determining a preset initial resource feedback position and a preset back-off algorithm;

obtaining a plurality of target resource feedback positions based on the preset initial resource feedback position and the preset back-off algorithm; and determining resource units at the plurality of target resource feedback positions as new target feedback resource units to obtain the re-determined feedback resource configuration information, wherein obtaining the plurality of target resource feedback positions further comprises:

sequentially performing a number determining step until a plurality of numbers of back-off resources are obtained; and obtaining the plurality of target resource feedback positions based on the preset initial resource feedback position and the plurality of numbers of back-off resources, and the number determining step further comprises:

determining the $n^{th}$, target resource feedback position; and obtaining the $n^{th}$ target resource range position based on a back-off formula, and adding 1 to n, the back-off formula being $M=N*2^{n-1}$ or $M=N*2n$, where M is the number of back-off resources and N is the number of resource units within the first downlink resource range.

10. The method according to claim 9, wherein transmitting the first response information further comprises:

performing an AND operation on the first response information and a second response information to obtain combined response information when the second response information corresponding to a second downlink resource range exists on any one of the plurality of target feedback resource units; and transmitting the combined response information to the base station, where a third downlink resource range corresponding to the combined response information includes the first downlink resource range and the second downlink resource range.

11. A base station, comprising:

a memory that stores a computer program; and a processor that is configured to execute the computer program stored in the memory to implement a method comprising:

determining feedback resource configuration information configured for a terminal, wherein the feedback resource configuration information includes a plurality of target feedback resource units; and transmitting the feedback resource configuration information to the terminal, such that the terminal transmits first response information corresponding to a first downlink resource range occupied by a downlink transmission to the base station on the plurality of target feedback resource units when the downlink transmission occurs between the terminal and the base station;

wherein a processor that is further configured to execute the computer program to implement:

determining a resource feedback position corresponding to each target feedback resource unit;

obtaining a reception result of receiving historical response information at the resource feedback position in a preset number of historical downlink transmissions; and re-determining the feedback resource configuration information when the reception result meets a preset adjustment condition;

wherein re-determining the feedback resource configuration information further comprises:

determining a preset initial resource feedback position and a preset back-off algorithm;

obtaining a plurality of target resource feedback positions based on the preset initial resource feedback position and the preset back-off algorithm; and determining resource units at the plurality of target resource feedback positions as new target feedback resource units to obtain the re-determined feedback resource configuration information;

wherein obtaining the plurality of target resource feedback positions further comprises:

sequentially performing a number determining step until a plurality of numbers of back-off resources are obtained; and obtaining the plurality of target resource feedback positions based on the preset initial resource feedback position and the plurality of numbers of back-off resources, and the number determining step further comprises:

determining the $n^{th}$ target resource feedback position; and obtaining the $n^{th}$ target resource range position based on a back-off formula, and adding 1 to n, the back-off formula being $M=N*2^{n-1}$ or $M=N*2n$, where M is the number of back-off resources and N is the number of resource units within the first downlink resource range.

12. The base station according to claim 11, wherein determining the feedback resource configuration information further comprises:

determining a plurality of preset uplink feedback resource units as the plurality of target feedback resource units to obtain the feedback resource configuration information.

13. The base station according to claim 11, wherein determining the feedback resource configuration information further comprises:

determining a target feedback resource unit set from a plurality of preset feedback resource unit sets that each include a plurality of uplink feedback resource units; and determining a plurality of uplink feedback resource units in the target feedback resource unit set as the plurality of target feedback resource units, where different feedback resource unit sets have different uplink feedback resource units.

14. The base station according to claim 11, wherein the preset adjustment condition further comprises:

a number of failures to receive the historical response information at at least one resource feedback position being greater than or equal to a first preset number; or a total number of failures to receive the historical response information being greater than or equal to a second preset number in the preset number of historical downlink transmissions.

15. The base station according to claim 11, wherein re-determining the feedback resource configuration information further comprises:

determining a new target feedback resource unit set from a plurality of preset feedback resource unit sets; and obtaining the re-determined feedback resource configuration information.

* * * * *